June 9, 1959  S. L. NITKIEWICZ  2,890,321
SPACER FOR TUBE FORMING MILLS

Filed Nov. 8, 1956  2 Sheets-Sheet 1

INVENTOR.
STANLEY L. NITKIEWICZ
BY
ATTORNEY

June 9, 1959   S. L. NITKIEWICZ   2,890,321
SPACER FOR TUBE FORMING MILLS
Filed Nov. 8, 1956   2 Sheets-Sheet 2

INVENTOR.
STANLEY L. NITKIEWICZ
BY
*Malcolm W. Fraser*
ATTORNEY

United States Patent Office 2,890,321
Patented June 9, 1959

2,890,321

SPACER FOR TUBE FORMING MILLS

Stanley L. Nitkiewicz, Toledo, Ohio, assignor to Abbey Etna Machine Company, a corporation of Ohio Application November 8, 1956, Serial No. 621,140

1 Claim. (Cl. 219—59)

This invention relates to machines for continuously and progressively forming a flat metallic ribbon into tube form and then welding the seam of the tube to form an endless imperforate cylindrical tube, but more particularly to the guiding of the free edges of the tube to be welded to the welding apparatus for insuring that the edges are disposed in exactly abutting relation and to obviate undesirable overlap or other irregular disposition thereof.

An object is to produce a simple and efficient device disposed within the traveling tube to space the edges thereof properly so that when the tube is squeezed together the edges are in the proper abutting relation, the device operating smoothly and with a minimum of friction and without interference to the flow of electrical current to the point of weld.

Other objects and advantages of the invention will hereinafter appear and for purposes of illustration but not of limitation an embodiment of the invention is shown on the accompanying drawings in which Figure 1 is a fragmentary top plan view, some parts being broken away and some in section showing a tube passing between welding pressure rolls and indicating the spacer device for spacing the edges of the tubes properly as they pass to such rolls;

The illustrated embodiment of the invention comprises a portion of a tube mill, the tube T having been formed into a tube by a series of forming rollers (not shown) and being advanced continuously between a pair of pressure rollers P which are disposed over a guide roller P' disposed therebetween so that the spaced edges of the tube are squeezed together and properly guided as the two advances. It will be noted that the free edges of the tube S are spaced from each other but these edges are forced into engagement and in abutting relation by the pressure rolls P. Before reaching such squeezing or pressure rolls a pair of welding electrodes W are arranged in such fashion that they slidably engage the top of the tube or the edges at the proper distance from the point where the edges are brought together. This distance is predetermined and varies with the diameter and wall thickness of the tube to be welded. Ultra-high frequency electric current is delivered to the electrodes W and such may be in the region of radio frequency for creating the desired weld but since the precise manner of welding forms no part of this invention, further description and illustration thereof is not considered necessary.

Figure 1:
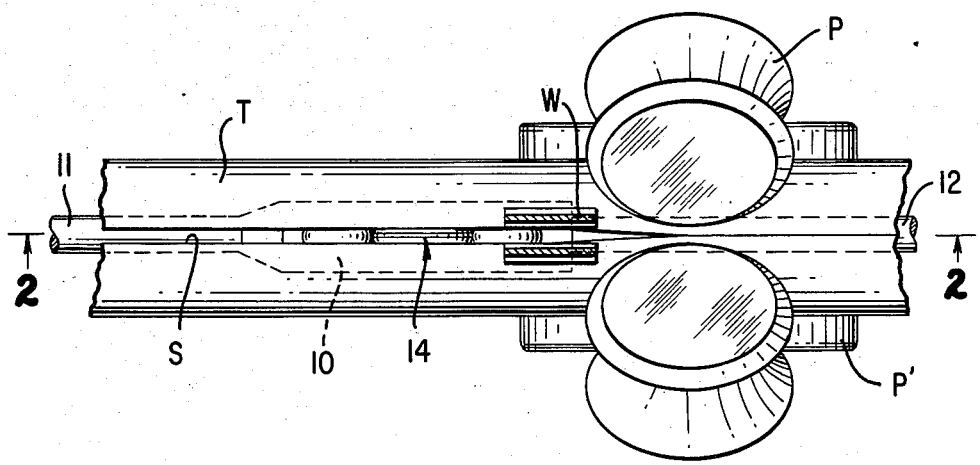
Figure 4:
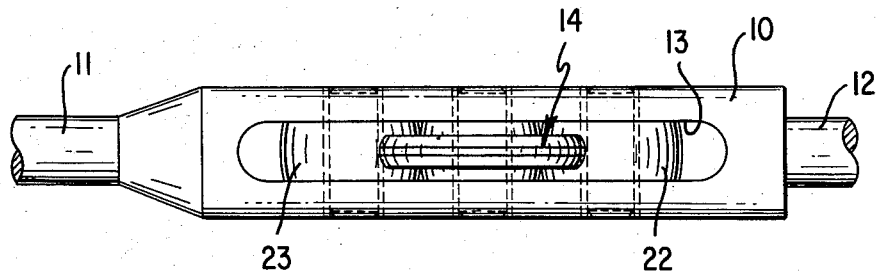
Figure 4 is a top plan view of the spacer device removed from the position within the tube to be welded.
Figure 2:
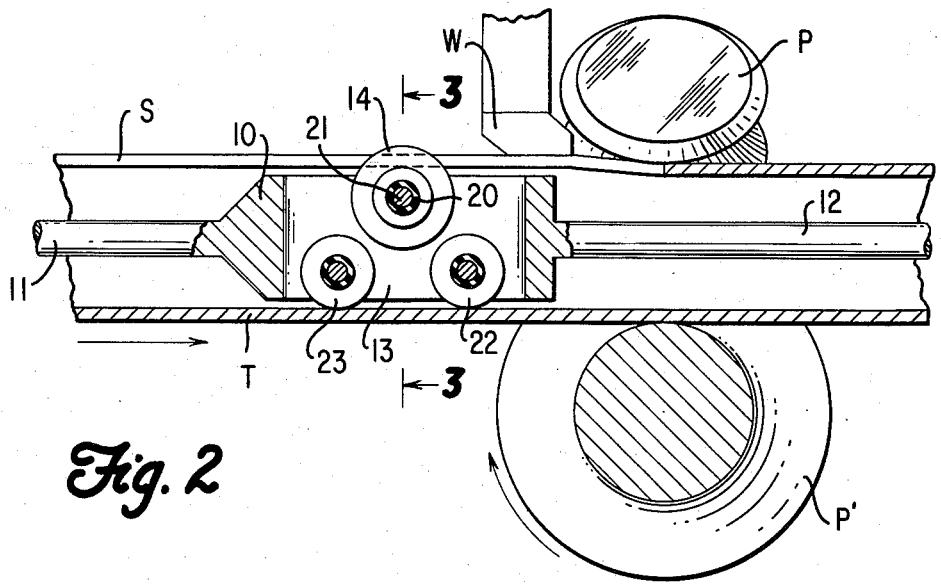
Figure 2 is a longitudinal sectional view substantially on the line 2—2 of Figure 1.
Figure 3:
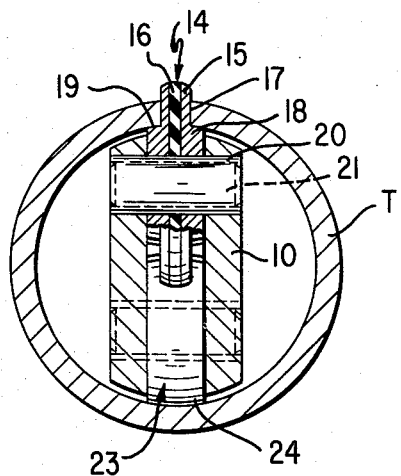
Figure 3 is an enlarged transverse sectional view substantially on the line 3—3 of Figure 2.

In accordance with this invention a spacer device is disposed within the traveling tube and as shown comprises an elongate metallic housing 10 from the rear end of which extends an anchor rod 11 which extends rearwardly and is suitably anchored to a bracket (not shown) outside of the tube. Extending forwardly from the housing 10 is a rod 12 which may carry a scarfing tool (not shown) for scarfing the welded seam. The housing is provided with a vertically disposed longitudinally elongate open ended cavity 13 which is provided with parallel laterally spaced side walls. Disposed within the cavity 13 and at the upper portion thereof is a free turning spacer roller 14. The roller 14 is made up of outer metallic sections 15 separated by a washer-like member 16 of electrical insulating material and this washer may be suitably bonded to the adjacent metallic sections 15. The outer sides of the metallic sections 15 are flat in order to conform to the edges S of the tube, as indicated on Figure 3. It will be understood that as the tube T advances, the free edges S engage the opposite sides of the metallic sections 15 so that the roller not only spaces these edges but rotates due to the frictional engagement between the tube edges and the flat walls 17.

Each of the metallic roller sections 15 is formed with an outwardly extending hub 18 formed with a curved tube engaging edge portion 19, the latter conforming to the configuration of the inside wall of the tube. Thus the ledge supports the edge portions of the tube and this is particularly important in the case of thin-walled tubing.

The spacer wheel 14 rolls freely upon a bearing sleeve 20 of electrical insulating material, and the ends of which have a press fit in holes provided in the side walls of the housing 10. Within the sleeve 20 is a steel core 21 for strengthening and reinforcing purposes.

Carried by the housing 10 and for rolling contact on the inner wall of the tube T opposite to the spaced edges S are fore and aft rolls 22 and 23 respectively. These rolls are of metal and are similarly mounted on electrically insulating sleeves having metallic cores and the peripheral surfaces of each of these rollers is curved as indicated at 24 to conform to the curvature of the tube T. It will be seen that the several rolls while free to rotate have a nice fit between the spaced walls of the housing 10 to obviate any wabble.

It will be observed that the spacer roll 14 is disposed in a position just in advance of where the edges S are formed into a V by the squeezing or pressure rolls P. Thus these edges are properly spaced from each other. It will also be observed that the spacer roll 14 is slightly in advance of the welding electrodes W and due to the structure of the spacer rolls there is no liability of the current passing across the spacer roll from one tube edge to the other. The metallic sections of the spacer roll insure that the device will operate over a long period of time since the metallic sections of the roll resist abrasive tendencies so that wear is reduced to a minimum. By arranging the supporting rolls 22 and 23 fore and aft with respect to the spacer roll, the latter is at all times disposed in proper position with relation to the tube edges.

Numerous changes in details of constructions, arrangement and operation may be effected without departing from the spirit of the invention, especially as defined in the appended claim.

What I claim is:

A spacer device for spacing the edges of a traveling tube in advance of the pressure rolls located at the point of welding, said device comprising a housing disposed stationarily within the tube to be welded and arranged slightly in advance of the pressure rolls, a spacer roller carried by the housing and projecting between the spaced edges of the tube so as to be engaged on both sides by the tube edges, said spacer roller rotating as the tube advances to the pressure rolls and maintaining the tube edges spaced a predetermined distance apart, and a pair of supporting rollers on the underside of the housing and over which the tube travels in contact therewith for maintaining the spacer roll in seam spacing and guiding position, said supporting roller being below said spacer roll and disposed fore and aft of the pressure roller and engaging said tube substantially 180° offset from the points of contact of the first mentioned roller, said housing comprising a pair of parallel laterally spaced vertical plates rigidly affixed to one another at the forward and rear ends of the housing, said spacer roller and said supporting roller each having major portions thereof disposed between said plates and being rotatably supported on bearing shafts extending across the space between said plates and having their opposite ends respectively supported in said plates, a minor portion of said spacer roller extending above the upper edges of the plates and minor portions of said supporting rollers respectively extending below the lower edges of the plates.

References Cited in the file of this patent

UNITED STATES PATENTS

| | | |
|---|---|---|
| 2,139,211 | Sessions | Dec. 6, 1938 |
| 2,196,106 | Darner | Apr. 2, 1940 |
| 2,613,303 | Babbitt | Oct. 7, 1952 |